(12) United States Patent
Park et al.

(10) Patent No.: US 9,325,457 B2
(45) Date of Patent: Apr. 26, 2016

(54) METHOD OF PROVIDING HARQ FEEDBACK INFORMATION

(71) Applicant: ELECTRONICS AND TELECOMMUNICATIONS RESEARCH INSTITUTE, Daejeon (KR)

(72) Inventors: Jisoo Park, Daejeon (KR); Young-il Kim, Daejeon (KR); Won Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 126 days.

(21) Appl. No.: 14/043,980

(22) Filed: Oct. 2, 2013

(65) Prior Publication Data

US 2014/0092839 A1    Apr. 3, 2014

(30) Foreign Application Priority Data

Oct. 2, 2012   (KR) .................. 10-2012-0109666
Oct. 4, 2012   (KR) .................. 10-2012-0109966
Oct. 16, 2012  (KR) .................. 10-2012-0114525
Aug. 9, 2013   (KR) .................. 10-2013-0095025

(51) Int. Cl.
H04L 1/18    (2006.01)

(52) U.S. Cl.
CPC .................................. H04L 1/1861 (2013.01)

(58) Field of Classification Search
CPC ..................... H04L 1/1861; H04L 5/0055
See application file for complete search history.

(56) References Cited

U.S. PATENT DOCUMENTS

| | | | |
|---|---|---|---|
| 2009/0181689 A1 | 7/2009 | Lee et al. | |
| 2009/0276676 A1 | 11/2009 | Lee et al. | |
| 2010/0115360 A1* | 5/2010 | Seok et al. | 714/748 |

FOREIGN PATENT DOCUMENTS

| | | |
|---|---|---|
| KR | 10-2009-0078723 A | 7/2009 |
| KR | 10-2009-0078724 A | 7/2009 |
| KR | 10-2009-0078727 A | 7/2009 |
| KR | 10-2009-0078731 A | 7/2009 |
| KR | 10-2009-0114802 A | 11/2009 |
| KR | 10-2012-0005520 A | 1/2012 |
| WO | WO 2010/129353 A2 | 11/2010 |

OTHER PUBLICATIONS

"IEEE Standard for WirelessMAN-Advanced Air Interface for Broadband Wireless Access Systems." IEEE Std 802.16.1™-2012. Sep. 7, 2012 (1090 pages, in English).
"WiMAX Forum TM Interoperability Problem Report Clarification for HARQ Feedback Regions-1." WiMAX Forum, 2013 (10 pages, in English).
"WiMAX Forum TM Interoperability Problem Report Clarification for HARQ Feedback Regions-2." WiMAX Forum, 2013 (13 pages, in English).

* cited by examiner

*Primary Examiner* — Paul H Masur
*Assistant Examiner* — Kabir Jahangir
(74) *Attorney, Agent, or Firm* — NSIP Law

(57) ABSTRACT

In a wireless communication system where a terminal and a base station communicate with each other using a frame including at least one downlink sub-frame and at least one uplink sub-frame, the terminal and the base station calculate the number of hybrid automatic repeat request (HARQ) feedback regions of the downlink sub-frames and the uplink sub-frames in accordance with a third value corresponding to an absolute value of subtraction between a first value corresponding to the number of downlink sub-frames of the frame and a second value corresponding to the number of uplink sub-frames of the frame or the sum of the first value and the second value and configure HARQ feedback regions in the downlink sub-frames and the uplink sub-frames.

20 Claims, 8 Drawing Sheets

CALCULATE $R_i$ of DL SUBFRAMES AND UL SUBFRAMES USING D, U, AND K — S310

CONFIGURE HARQ FEEDBACK REGIONS IN DL SUBFRAMES AND UL SUBFRAMES — S330

METHOD OF PROVIDING HARQ FEEDBACK INFORMATION

CROSS-REFERENCE TO RELATED APPLICATIONS

This application claims priority to and the benefit of Korean Patent Application Nos. 10-2012-0109666, 10-2012-0109966, 10-2012-0114525, and 10-2013-0095025 filed in the Korean Intellectual Property Office on Oct. 2, 2012, Oct. 4, 2012, Oct. 16, 2012, and Aug. 9, 2013, the entire contents of which are incorporated herein by reference.

BACKGROUND (a) Field

The present invention relates to a method of providing hybrid automatic repeat request (HARQ) feedback information. More particularly, the present invention relates to a method of providing configuration information of hybrid automatic repeat request (HARQ) feedback regions of a sub-frame, that is, the number of feedback regions in a time division duplex (TDD) mode.

(b) Description of Related Art

A wideband wireless access system is a next generation communication method of supporting hybrid automatic repeat request (HARQ) in which forward error correction (FEC) and automatic repeat request (ARQ) are combined with each other as an error compensation technique for securing reliability of communications with high speed data packet transmission and a small amount of delay.

In the wireless access system, a duplexing communication method is divided into a frequency division duplex (FDD) transmission mode method and a time division duplex (TDD) transmission mode method. The FDD transmission mode method distinguishes upward and downward transmitting and receiving resources by frequency to support bidirectional communications of uplink and downlink. The TDD transmission mode method distinguishes upward and downward transmitting and receiving resources by time to support bidirectional communications of uplink and downlink.

In the HARQ technique, a receiver decodes a data packet received by a physical layer to determine whether an error is detected, and transmits an acknowledgement (ACK) signal as a response signal when it is determined that the error is not generated to inform a transmitter that the data packet is successfully received. However, the receiver decodes the received data packet and transmits a negative acknowledgement (NACK) signal as a response signal when it is determined that an error is detected to inform the transmitter that the error is detected. The transmitter may re-transmit the data packet when the NACK signal is received.

The HARQ technique is divided into a synchronous HARQ technique and an asynchronous HARQ technique in accordance with transmission timing of a retransmitted packet. In the synchronous HARQ technique, a transmission point in time of the retransmitted packet with respect to an initially transmitted packet is uniformized. In the asynchronous HARQ technique, the transmission point in time of the retransmitted packet with respect to an initially transmitted packet is determined by a scheduler of a base station.

In addition, the HARQ technique is divided into an adaptive HARQ technique and a non-adaptive HARQ technique in accordance with whether an amount and a position of an allocated resource are changed. In the adaptive HARQ technique, the amount and position of the allocated resource may be changed. In the non-adaptive HARQ technique, the amount and position of the allocated resource are fixed.

In order to reduce signaling overhead in accordance with a control signal such as resource allocation information, it is effective to use a synchronous and non-adaptive HARQ technique. However, when the signaling overhead is not considered, it may be effective to use an asynchronous and adaptive HARQ technique with a scheduling gain.

A high scheduling gain and a high speed data transmission effect may be obtained by appropriately mixing the synchronous and asynchronous HARQ techniques and the adaptive and non-adaptive HARQ techniques, and using small signaling overhead.

When a terminal uses the synchronous HARQ technique for uplink, in order to transmit a HARQ packet to uplink, resource must be allocated by a downlink control signal from a base station. That is, the terminal receives an uplink transmission resource from the downlink control signal of the base station and transmits the HARQ packet to a designated position (a slot or a sub-frame). In addition, the base station transmits ACK feedback of the downlink as a HARQ feedback signal when the HARQ packet is successfully received without an error, and transmits NACK feedback of the downlink as a HARQ feedback signal when the HARQ packet is not received. At this time, the terminal retransmits a packet at a previously allocated designated point in time when the NACK feedback is received as the HARQ feedback signal.

In the TDD transmission mode divided into uplink and downlink, one frame may consist of at least one sub-frame with respect to uplink and downlink. A ratio between the number of sub-frames allocated to uplink and the number of sub-frames allocated to downlink may vary in accordance with a type of a frame structure. For example, when the number of sub-frames that form one frame is 6, 7, or 8, a ratio between the number of sub-frames allocated to uplink and the number of sub-frames allocated to downlink may be 3:3, 4:2, 2:4, 5:2, 3:4, 4:3, 2:5, 6:2, 5:3, 4:4, 3:5, or 2:6, and one of the above frame structures may be selected.

The downlink or every sub-frame of the downlink has at least one HARQ feedback region, and HARQ feedback is allocated to a corresponding HARQ feedback region.

The number of HARQ feedback regions may vary every sub-frame in accordance with the ratio between the number of sub-frames allocated to uplink and the number of sub-frames allocated to downlink. When the number of sub-frames allocated to uplink is equal to the number of sub-frames allocated to downlink, one HARQ feedback region may exist in each of the uplink and downlink sub-frames. On the other hand, when the number of sub-frames allocated to uplink and downlink varies, the number of HARQ feedback regions may vary every downlink sub-frame and the number of HARQ feedback regions may vary every uplink sub-frame.

That is, the number of HARQ feedback regions in each of the downlink and uplink sub-frames may be determined by a correlation among the downlink and uplink sub-frames, downlink, and the number of downlink sub-frames. Therefore, a base station and a terminal store information on the HARQ feedback regions in accordance with the ratio between the number of sub-frames allocated to uplink and the number of sub-frames allocated to downlink in a memory in the form of a lookup table, and provide the information on the HARQ feedback regions using the lookup table. The base station and the terminal confirm the numbers of HARQ feedback regions of the downlink and uplink sub-frames in accordance with the numbers of downlink and uplink sub-frames that form one frame using the lookup table, and allocate the HARQ feedback regions to the downlink and uplink sub-frames, respectively.

However, in a method of providing information on the HARQ feedback regions using the lookup table, a memory for storing the lookup table is required and it is difficult to immediately support an added frame structure. In addition, in order for the base station and the terminal to support various added frame structures, information on HARQ feedback regions of an added frame structure must be updated in the lookup table by changing a program.

SUMMARY

A technical object of the present invention is to provide a method of providing hybrid automatic repeat request (HARQ) feedback information to dynamically obtain information on HARQ feedback regions that are system configuration parameters configured to vary in accordance with a wireless frame configuration ratio between uplink and downlink in accordance with a frame structure without depending on a lookup table, and to be applied to a newly added frame structure without updating the lookup table to add information on HARQ feedback regions.

According to an exemplary embodiment of the present invention, a method of providing hybrid automatic repeat request (HARQ) feedback information in a wireless communication system where a terminal and a base station communicate with each other using a frame including at least one downlink sub-frame and at least one uplink sub-frame is provided. The HARQ feedback information providing method includes calculating a third value corresponding to an absolute value of subtraction between a first value corresponding to a number of downlink sub-frames of the frame and a second value corresponding to a number of uplink sub-frames of the frame or the sum of the first value and the second value, calculating a number of HARQ feedback regions of the downlink sub-frames and the uplink sub-frames in accordance with the third value, and configuring HARQ feedback regions in the downlink sub-frames and the uplink sub-frames in accordance with the number of HARQ feedback regions of the downlink sub-frames and the uplink sub-frames.

Calculating the number of HARQ feedback regions of the downlink sub-frames and the uplink sub-frames in accordance with the third value may include determining the number of HARQ feedback regions of the downlink sub-frames and the uplink sub-frames in accordance with a magnitude of the first value and a magnitude of the second value and whether the third value is an even number or an odd number.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the downlink sub-frames as 1 when the third value is an even number and the first value is larger than the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the uplink sub-frames as the smallest integer of integers larger than or equal to a value obtained by dividing the first value by the second value or 1 in accordance with parameters determined in accordance with the first value and the second value when the third value is an even number and the first value is larger than the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the downlink sub-frames as the smallest integer of integers larger than or equal to a value obtained by dividing the second value by the first value or 1 in accordance with parameters determined in accordance with the first value and the second value when the third value is an even number and the first value is smaller than or equal to the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the uplink sub-frames as 1 or 0 in accordance with parameters determined in accordance with the first value and the second value when the third value is an even number and the first value is smaller than or equal to the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the downlink sub-frames as 1 when the third value is an odd number and the first value is larger than the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the uplink sub-frames as the smallest integer of integers larger than or smaller than a value obtained by dividing the first value by the second value or the largest integer of integers smaller than or equal to a value obtained by dividing the first value by the second value in accordance with the second value when the third value is an odd number and the first value is larger than the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the downlink sub-frames as the smallest integer of integers larger than or smaller than a value obtained by dividing the second value by the first value or the largest integer of integers smaller than or equal to a value obtained by dividing the second value by the first value in accordance with the indices of the downlink sub-frames when the third value is an odd number and the first value is smaller than or equal to the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the uplink sub-frames as 1 or 0 in accordance with parameters determined in accordance with the first value and the second value when the third value is an odd number and the first value is smaller than or equal to the second value.

The HARQ feedback information providing method may further include calculating a maximum value and a minimum value of the number of HARQ feedback regions of the downlink sub-frames and the uplink sub-frames in accordance with the third value.

Calculating a maximum value and a minimum value of the number of HARQ feedback regions of the downlink sub-frames and the uplink sub-frames in accordance with the third value may include determining the maximum value and the minimum value of the number of HARQ feedback regions of the downlink sub-frames and the uplink sub-frames in accordance with a magnitude of the first value and a magnitude of the second value and whether the third value is an even number or an odd number.

According to anther exemplary embodiment of the present invention, a method of providing hybrid automatic repeat request (HARQ) feedback information in a wireless communication system where a terminal and a base station communicate with each other using a frame including at least one downlink sub-frame and at least one uplink sub-frame is provided. The HARQ feedback information providing method includes calculating a third value corresponding to an absolute value of subtraction between a first value corresponding to the number of downlink sub-frames of the frame and a second value corresponding to the number of uplink sub-frames of the frame or the sum of the first value and the second value, determining the number of HARQ feedback regions of the downlink sub-frames and the uplink sub-frames in accordance with a magnitude of the first value and a magnitude of the second value and whether the third value is an even number or an odd number, and configuring HARQ feedback regions in the downlink sub-frames and the uplink sub-frames in accordance with the number of HARQ feedback regions of the downlink sub-frames and the uplink sub-frames. HARQ feedback signals corresponding to the HARQ feedback regions may be allocated to the downlink sub-frames and the uplink sub-frames.

The HARQ feedback information providing method may further include determining the minimum value and the maximum value of the number of HARQ feedback regions of the downlink sub-frames and the uplink sub-frames in accordance with a magnitude of the first value and a magnitude of the second value and whether the third value is an even number or an odd number.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the downlink sub-frames as 1 and determining the number of HARQ feedback regions of the uplink sub-frames as the smallest integer of integers larger than or equal to a value obtained by dividing the first value by the second value or 1 in accordance with parameters determined in accordance with the first value and the second value when the third value is an even number and the first value is larger than the second value, and determining the number of HARQ feedback regions of the downlink sub-frames as the smallest integer of integers larger than or equal to a value obtained by dividing the second value by the first value or 1 in accordance with parameters determined in accordance with the first value and the second value and determining the number of HARQ feedback regions of the uplink sub-frames as 1 or 0 in accordance with the parameters when the third value is an even number and the first value is smaller than or equal to the second value.

Determining the number of HARQ feedback regions of the downlink sub-frames and the uplink sub-frames in accordance with a magnitude of the first value and a magnitude of the second value and whether the third value is an even number or an odd number may include determining the number of HARQ feedback regions of the downlink sub-frames as 1 and determining the number of HARQ feedback regions of the uplink sub-frames as the smallest integer of integers larger than or smaller than a value obtained by dividing the first value by the second value or the largest integer of integers smaller than or equal to a value obtained by dividing the first value by the second value according to the second value when the third value is an odd number and the first value is larger than the second value, and determining the number of HARQ feedback regions of the downlink sub-frames as the smallest integer of integers larger than or smaller than a value obtained by dividing the second value by the first value or the largest integer of integers smaller than or equal to a value obtained by dividing the second value by the first value and determining the number of HARQ feedback regions of the uplink sub-frames as 1 or 0 according to parameters determined in accordance with the first value and the second value when the third value is an odd number and the first value is smaller than or equal to the second value.

DETAILED DESCRIPTION

Figure 1:
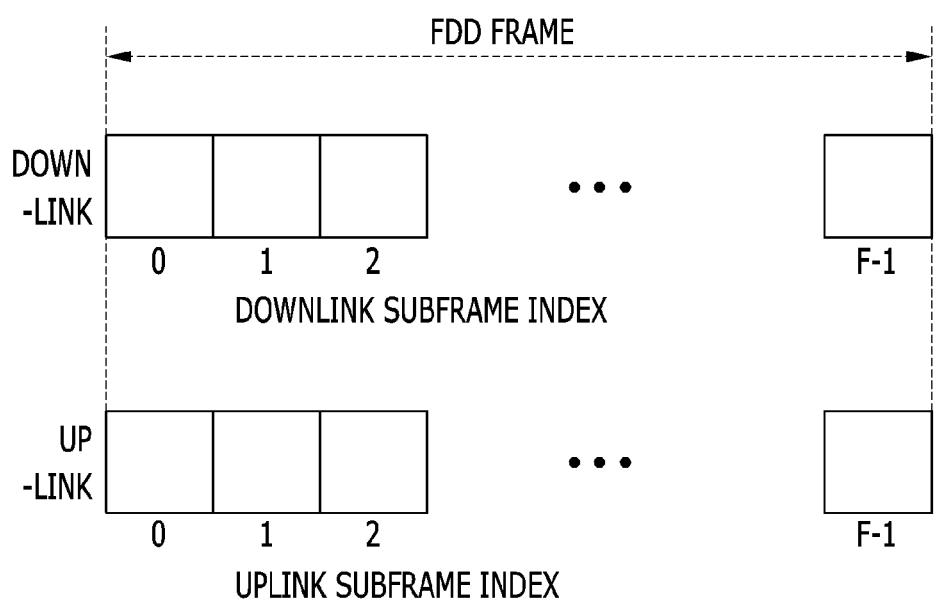
FIG. 1 is a view illustrating a frequency division duplex (FDD) frame.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising" will be understood to imply the inclusion of stated elements but not the exclusion of any other elements.

In the entire specification, a mobile station (MS) may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include entire or partial functions of the terminal, the MT, the AMS, the HR-MS, the SS, the PSS, the AT, and the UE.

In addition, a base station (BS) may refer to an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) that functions as the BS, and a high reliability relay station (HR-RS) that functions as the BS, and may include entire or partial functions of the ABS, the nodeB, the eNodeB, the AP, the RAS, the BTS, the MMR-BS, the RS, and the HR-RS.

Hereinafter, a method of providing hybrid automatic repeat request (HARQ) feedback information according to an exemplary embodiment of the present invention will be described in detail with reference to the accompanying drawings.

FIG. 1 is a view illustrating a frequency division duplex (FDD) frame.

Referring to FIG. 1, in an FDD mode, data is transmitted and received through one downlink (DL) band and one uplink (UL) band corresponding to the DL band.

Since UL transmission and DL transmission are divided by frequency in the FDD mode, the FDD frame includes one of DL sub-frames and UL sub-frames in a specific frequency band. That is, the FDD frame may include F DL sub-frames in the DL band and may include F UL sub-frames in the UL band. F corresponds to the number of sub-frames that form one FDD frame. Downlink sub-frame indices corresponding to 0 to F-1 are allocated to the F DL sub-frames, and uplink sub-frame indices corresponding to 0 to F-1 are allocated to the F UL sub-frames.

Figure 2:
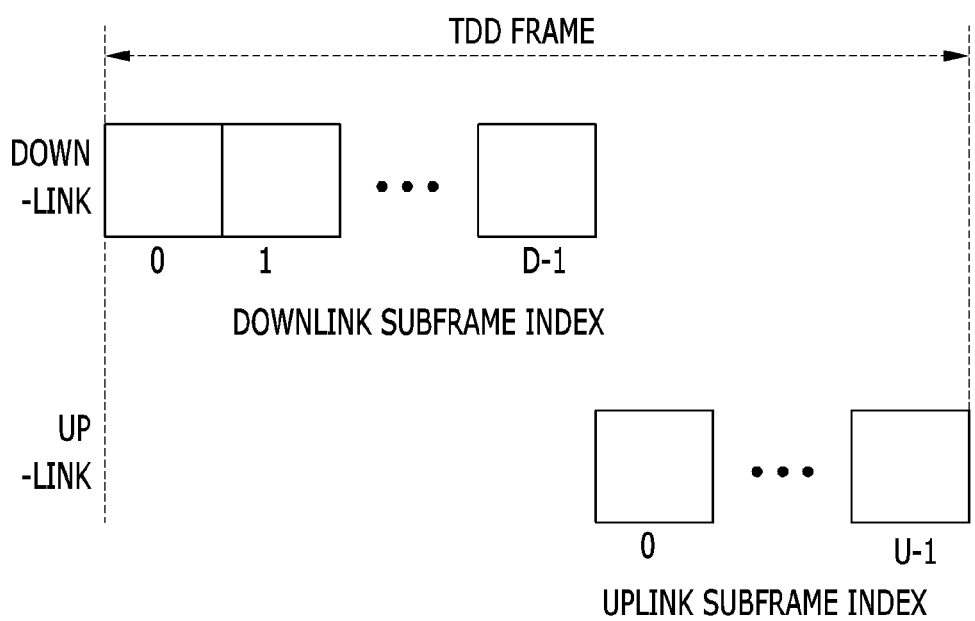
FIG. 2 is a view illustrating a time division duplex (TDD) frame according to an exemplary embodiment of the present invention.

FIG. 2 is a drawing illustrating a time division duplex (TDD) frame. Referring to FIG. 2, in a TDD mode, the TDD frame is divided into a UL time unit and a DL time unit in a time domain, and data is transmitted and received through the UL and DL time units.

As described above, in the TDD mode, since UL transmission and DL transmission are distinguished from each other by time, the TDD frame includes D DL sub-frames and U UL sub-frames in a specific frequency band. The D and the U may be equal to each other or may be different from each other. DL sub-frame indices corresponding to 0 to D-1 are allocated to the D DL sub-frames, and UL sub-frame indices corresponding to 0 to U-1 are allocated to the U UL sub-frames.

In the TDD mode, in one TDD frame, a ratio between the number of DL sub-frames and the number of UL sub-frames may vary in accordance with a type of a frame structure. When the number of sub-frames that form one TDD frame is 6, the ratio between the number of DL sub-frames and the number of UL sub-frames may be 3:3, 4:2, or 2:4. When the number of sub-frames that form one TDD frame is 7, the ratio between the number of DL sub-frames and the number of UL sub-frames may be 5:2, 3:4, 4:3, or 2:5. In addition, when the number of sub-frames that form one TDD frame is 8, the ratio between the number of DL sub-frames and the number of UL sub-frames may be 6:2, 5:3, 4:4, 3:5, or 2:6. One of the various frame structures may be selected as a frame to be used in the TDD mode.

In the IEEE802.16.1 (IEEE802.16m) wireless communication system, the number D of DL sub-frames and the number U of UL sub-frames in accordance with frame structures are defined as illustrated in Table 1.

TABLE 1

| Ratio | CP(G) Ratio | Cannel bandwidth | | |
|---|---|---|---|---|
| | | 7 | 8.75 | 5, 10, 20 |
| TDD(D:U) | G = 1/16 | 4:2, 3:3 | 5:2, 4:3, 3:4 | 6:2, 5:3, 4:4, 3:5 |
| | G = 1/18 | 3:2, 2:3 | 5:2, 4:3, 3:4 | 6:2, 5:3, 4:4, 3:5 |
| | G = 1/4 | 3:2, 2:3 | 4:2, 3:3, 2:4 | 5:2, 4:3, 3:4 |

In Table 1, CP represents a cyclic prefix ratio of an orthogonal frequency division multiple access (OFDMA) symbol.

Figure 3:
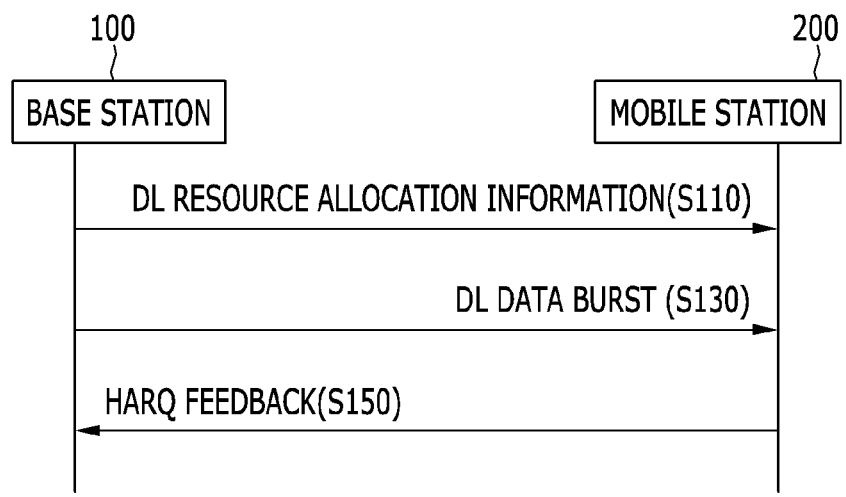
FIG. 3 is a view illustrating a downlink (DL) data communication method according to an exemplary embodiment of the present invention.

FIG. 3 is a view illustrating a DL data communication method according to an exemplary embodiment of the present invention.

Referring to FIG. 3, a base station 100 transmits DL resource allocation information to a mobile station 200 in an Ith sub-frame of an ith frame (S110). The DL resource allocation information may be included in a control signal such as an advanced MAP (A-MAP).

Next, the base station 100 starts to transmit a DL data burst such as a sub-packet through a DL resource allocated in accordance with the DL resource allocation information in an mth sub-frame of the ith frame (S130).

When the mobile station 200 receives the DL data burst, a hybrid automatic repeat request (HARQ) feedback is transmitted to the base station 100 (S150). The mobile station 200 may decode the received DL data burst, may transmit acknowledgement (ACK) feedback corresponding to a positive response to the base station 100 when the mobile station 200 successfully decodes the received DL data burst, and may transmit negative acknowledgement (NACK) feedback corresponding to a negative response to the base station 100 when the mobile station 200 fails to decode the received DL data burst. The mobile station 200 uses an nth sub-frame of a jth frame in order to transmit the HARQ feedback.

According to the exemplary embodiment of the present invention, when one super-frame consists of four frames, frame indices may be in a range between 0 and 3.

Table 2 represents TDD HARQ timing according to the exemplary embodiment of the present invention. Frame indices i and j and sub-frame indices I, m, and n for TDD DL HARQ transmitting and receiving timing of allocation of resources corresponding to a DL HARQ packet to DL, transmission of the DL HARQ packet, and feedback of HARQ corresponding to the DL HARQ packet to UL may be determined as illustrated in Table 2 in accordance with the number D of DL sub-frames and the number U of UL sub-frames in the TDD frame as illustrated in Table 1. I represents a sub-frame index of resource allocation information, m represents a sub-frame index of HARQ packet transmission, and n represents a sub-frame index of HARQ feedback.

TABLE 2

| Item | Sub-frame index | Frame index |
|---|---|---|
| DL resource allocation control signal information | l | i |

TABLE 2-continued

| Item | Sub-frame index | Frame index |
| --- | --- | --- |
| transmission sub-frame | | |
| HARQ packet transmission sub-frame | $m = 1$ | $i$ |
| HARQ feedback signal transmission sub-frame | For $D > U$, $n = \begin{cases} 0, & \text{for } 0 \leq m < K \\ m - K, & \text{for } K \leq m < U + K \\ U - 1, & \text{for } U + K \leq m < D \end{cases}$ For $D \leq U$, $n = m - K$ | $j = (i + z) \bmod 4$ |

In Table 2, A mod B returns a remainder obtained by dividing A by B.

On the other hand, a parameter K determined by ability of the system such as channel bandwidth and the number of sub-frames in a TDD mode is used for obtaining a HARQ reference timing interval. A DL HARQ reference timing interval means a distance between the DL sub-frame in which the DL data burst is transmitted and the DL sub-frame in which the HARQ feedback is transmitted. A UL HARQ reference timing interval means a distance between a DL sub-frame in which UL resource allocation information is transmitted and a UL sub-frame in which a UL data burst is transmitted.

The parameter K may be determined by Equation 1 or 2.

$$K = \begin{cases} \text{floor}((D - U)/2), & \text{for } D > U \\ -\text{ceil}((U - D)/2), & \text{for } D \leq U \end{cases} \quad \text{(Equation 1)}$$

$$K = \begin{cases} \text{floor}((D - U)/2), & \text{for } D \geq U \\ -\text{ceil}((U - D)/2), & \text{for } D < U \end{cases} \quad \text{(Equation 2)}$$

In Equations 1 and 2, ceil(x) is a function that returns the smallest integer among integers larger than or equal to a parameter x. floor(x) is a function that returns the largest integer among integers smaller than or equal to the parameter x. When D=U, since K=0, Equation 1 is equivalent to Equation 2.

In Table 2, a DL feedback frame offset z of the TDD mode may be determined by Equation 3.

$$z = \begin{cases} 0, & \text{if } ((D - m - N_{TTI} + n) \geq T_{proc} \\ 1, & \text{else} \end{cases} \quad \text{(Equation 3)}$$

In Equation 3, $N_{TTI}$ as a value of TTI that is a transmission time unit represents the number of occupied sub-frames when the data burst is transmitted, that is, the number of sub-frames that the HARQ packet covers. When one TTI is transmitted, $N_{TTI}=1$, and when a long TTI is transmitted, $N_{TTI}=D$. $T_{proc}$ represents wireless signal processing time, that is, data burst processing time.

Figure 4:
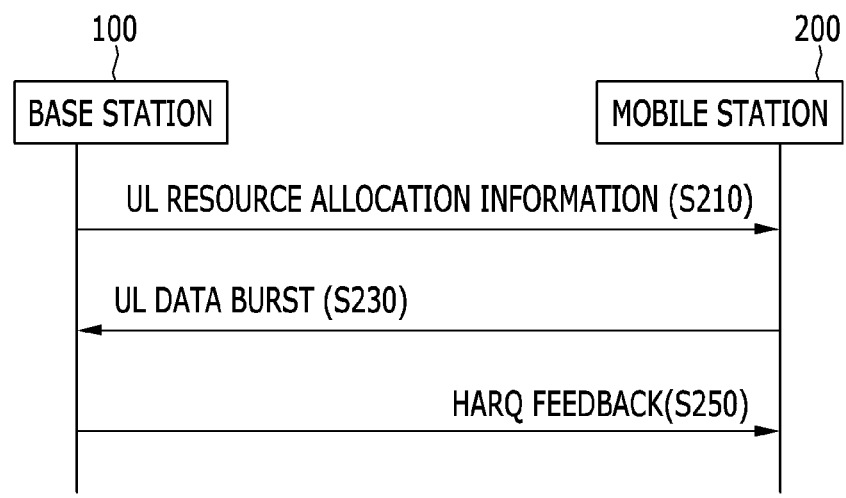
FIG. 4 is a flowchart illustrating an uplink (UL) data communication method according to an exemplary embodiment of the present invention.

FIG. 4 is a flowchart illustrating an UL data communication method according to an exemplary embodiment of the present invention.

Referring to FIG. 4, the base station 100 transmits UL resource allocation information to a mobile station 200 in the Ith sub-frame of the ith frame (S210). The UL resource allocation information may be included in the control signal such as the A-MAP.

Next, the mobile station 200 starts to transmit a UL data burst such as a sub-packet through a UL resource allocated in accordance with the UL resource allocation information in an mth sub-frame of a jth frame (S230).

The base station 100 transmits HARQ feedback for the received UL data burst to the mobile station 200 in an Ith sub-frame of a kth frame (S250). The base station 100 may decode the received UL data burst, may transmit the ACK feedback corresponding to the positive response to the mobile station 200 when the base station 100 successfully decodes the received UL data burst, and may transmit the NACK feedback corresponding to the negative response to the mobile station 200 when the base station 100 fails to decode the received UL data burst.

When the HARQ feedback is the negative response, the mobile station 200 may retransmit the UL data burst in an mth sub-frame of a pth frame.

Table 3 represents TDD UL HARQ timing according to the exemplary embodiment of the present invention. Frame indices I, j, k, and p and sub-frame indices I and m for TDD UL HARQ transmitting and receiving timing of allocation of resources corresponding to an UL HARQ packet to DL, transmission of the UL HARQ packet, and feedback of HARQ corresponding to the UL HARQ packet to DL may be determined as illustrated in Table 3 in the TDD frame structure as illustrated in Table 1. I represents a sub-frame index of resource allocation information and the HARQ feedback, and m represents a sub-frame index of HARQ packet transmission.

TABLE 3

| Item | Sub-frame (slot) index | Frame index |
| --- | --- | --- |
| UL resource allocation control signal message transmission sub-frame | $1$ | $i$ |
| HARQ packet transmission sub-frame | For $D \geq U$, $m = \begin{cases} 0, & \text{for } 0 \leq 1 < K \\ 1 - K, & \text{for } K \leq 1 < U + K \\ U - 1, & \text{for } U + K \leq 1 < D \end{cases}$ | $j = (i + v) \bmod 4$ |

TABLE 3-continued

| Item | Sub-frame (slot) index | Frame index |
|---|---|---|
| | For $1 < D < U$, $m = \begin{cases} 0, \ldots, \text{ or } 1-K, & \text{for } l = 0 \\ 1-K, & \text{for } 0 < l < D-1 \\ 1-K, \ldots, \text{ or } U-1, & \text{for } l = D-1 \end{cases}$ | |
| HARQ feedback signal transmission sub-frame | 1 | $k = (j + 1 + w) \bmod 4$ |
| HARQ packet retransmission sub-frame | m | $p = (k + v) \bmod 4$ |

In Table 3, a parameter K may be determined by Equation 1 or 2.

In Table 3, a UL data packet transmission frame offset v and a UL feedback frame offset w may be determined by Equation 4.

$$v = \begin{cases} 0, & \text{if } ((D-l-1+m) \geq T_{proc} \\ 1, & \text{else} \end{cases}$$ (Equation 4)

$$w = \begin{cases} 0, & \text{if } ((U-m-N_{TTI}+l) \geq T_{proc} \\ 1, & \text{else} \end{cases}$$

In Equation 4, when one TTI is transmitted, $N_{TTI}=1$, and when a long TTI is transmitted, $N_{TTI}=U$.

Figure 5:
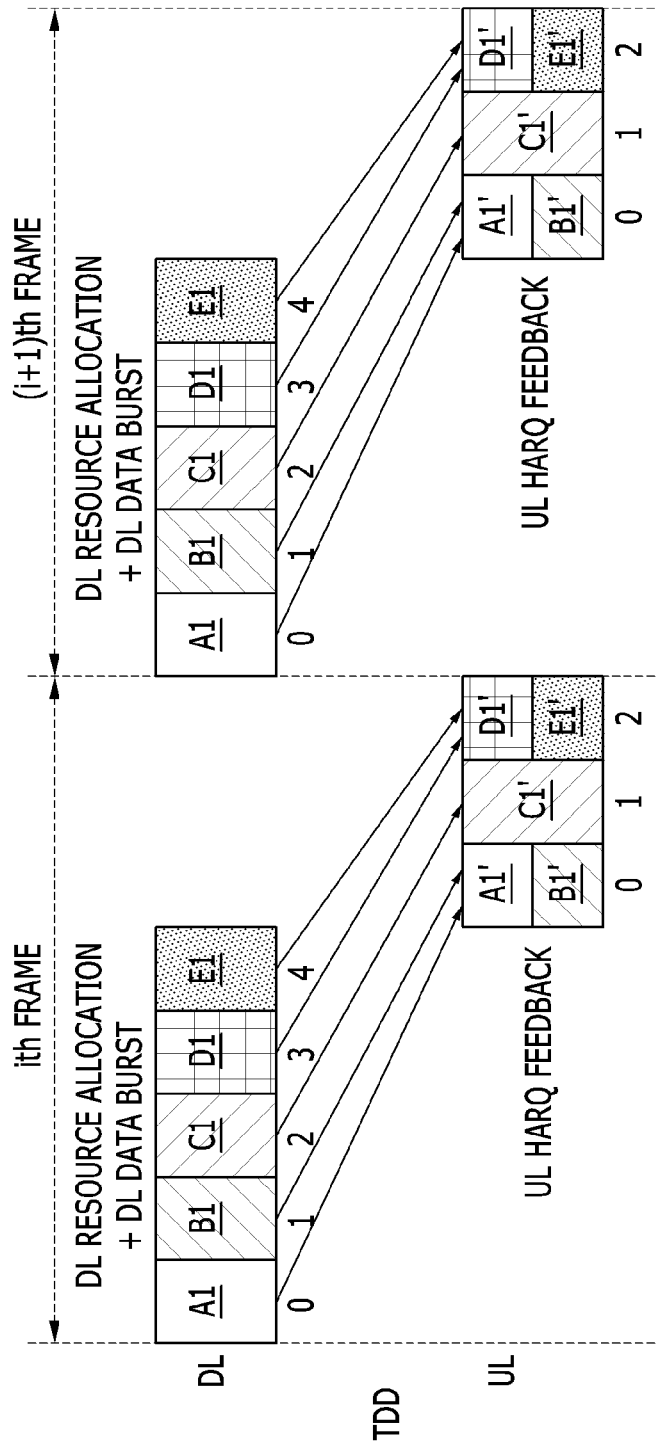
FIG. 5 is a view illustrating DL hybrid automatic repeat request (HARQ) timing according to an exemplary embodiment of the present invention.

FIG. 5 is a view illustrating DL HARQ timing according to an exemplary embodiment of the present invention.

In FIG. 5, it is assumed that the number D of DL sub-frames is 5 and the number U of UL sub-frames is 3, that is, D:U=5:3 (D+U=8) in a frame. In addition, it is assumed that $T_{proc}$ is i three sub-frames. That is, it is assumed that time for the mobile station 200 to receive a data packet or a MAP transmitted by the base station 100, to decode the received data packet or MAP, and to transmit HARQ feedback to UL is three sub-frames.

As illustrated in FIG. 5, when DL sub-frame indices that are position indices in which DL HARQ sub-packets of DL data packets A1, B1, C1, D1, and E1 are transmitted in respective frames are 0, 1, 2, 3, and 4, in accordance with Table 2, a UL sub-frame index of HARQ feedbacks A1' and B1' for DL data packets A1 and B1 may be 0, a UL sub-frame index of a HARQ feedback C1' for a DL data packet C1 may be 1, and a UL sub-frame index of HARQ feedbacks D1' and E1' for DL data packets D1 and E1 may be 2. That is, the number of HARQ feedback regions of the UL sub-frame index 0 is 2, the number of HARQ feedback regions of the UL sub-frame index 1 is 1, and the number of HARQ feedback regions of the UL sub-frame index 2 is 1.

Figure 6:
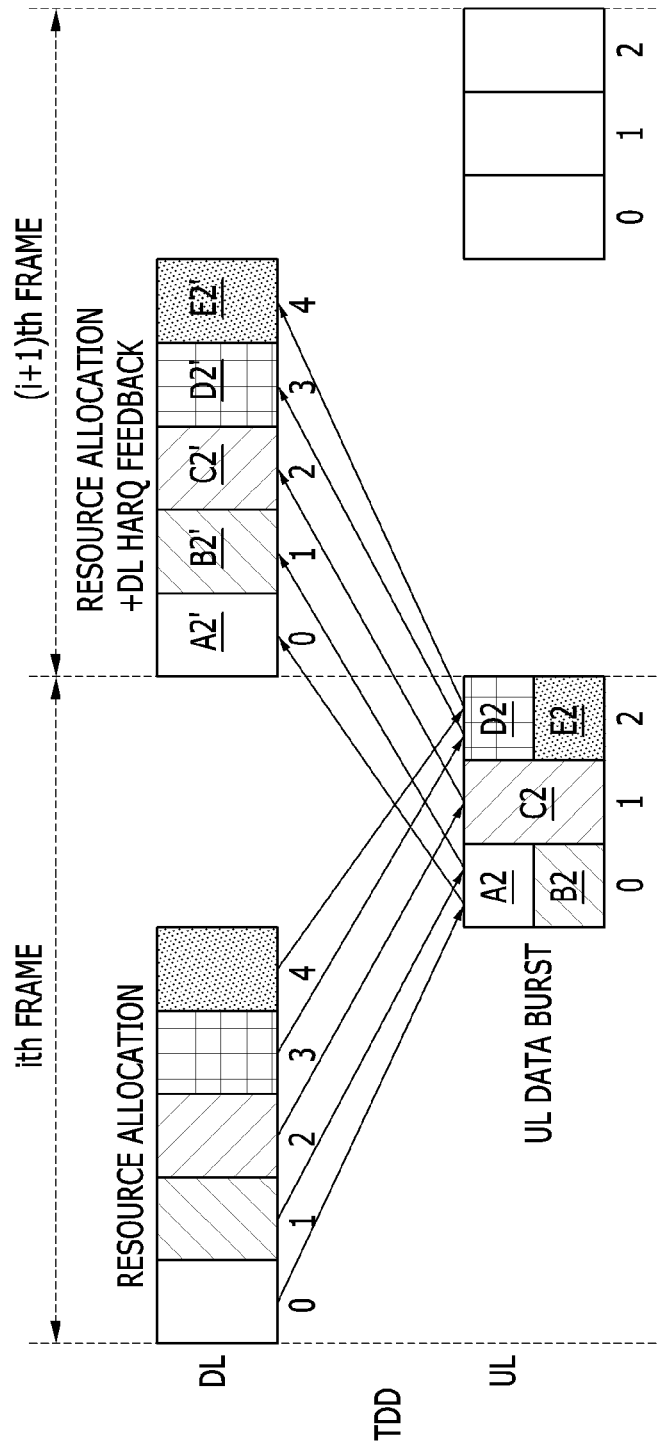
FIG. 6 is a view illustrating UL HARQ timing according to an exemplary embodiment of the present invention.

FIG. 6 is a view illustrating UL HARQ timing according to an exemplary embodiment of the present invention.

In FIG. 6, like in FIG. 5, it is assumed that the number D of DL sub-frames is 5 and the number U of UL sub-frames is 3, that is, D:U=5:3 (D+U=8) in a frame. In addition, it is assumed that $T_{proc}$ is i three sub-frames. That is, it is assumed that time for the base station 100 to receive a data packet transmitted by the mobile station 200, to decode the received data packet, and to transmit a feedback signal to DL and time for the base station 100 to receive UL HARQ feedback for a DL data packet and to decode the received UL HARQ feedback is three sub-frames.

As illustrated in FIG. 6, when DL sub-frame indices for transmission of UL resource allocation information for transmission of UL data packets A2, B2, C2, D2, and E2 in the ith frame are 0, 1, 2, 3, and 4, in accordance with Table 3, in the ith frame, the UL sub-frame index in which the UL HARQ data packets A2 and B2 are transmitted is 0, the UL sub-frame index in which the UL HARQ data packet C1 is transmitted is 1, and the UL sub-frame index in which the UL HARQ data packets D1 and E1 are transmitted is 2. DL sub-frame indices of HARQ feedbacks A2', B2', C2', D2', and E2' for the UL data packets A2, B2, C2, D2, and E2 may be 0, 1, 2, 3, and 4 in an (i+1)th frame. That is, in the (i+1)th frame, the number of HARQ feedback regions of the respective DL sub-frames is 1.

As illustrated in FIGS. 5 and 6, the number of HARQ feedback regions of the respective DL sub-frames and UL sub-frames is dependent on a correspondence relationship between the DL sub-frames and the UL sub-frames and the number of DL sub-frames and UL sub-frames.

Figure 7:
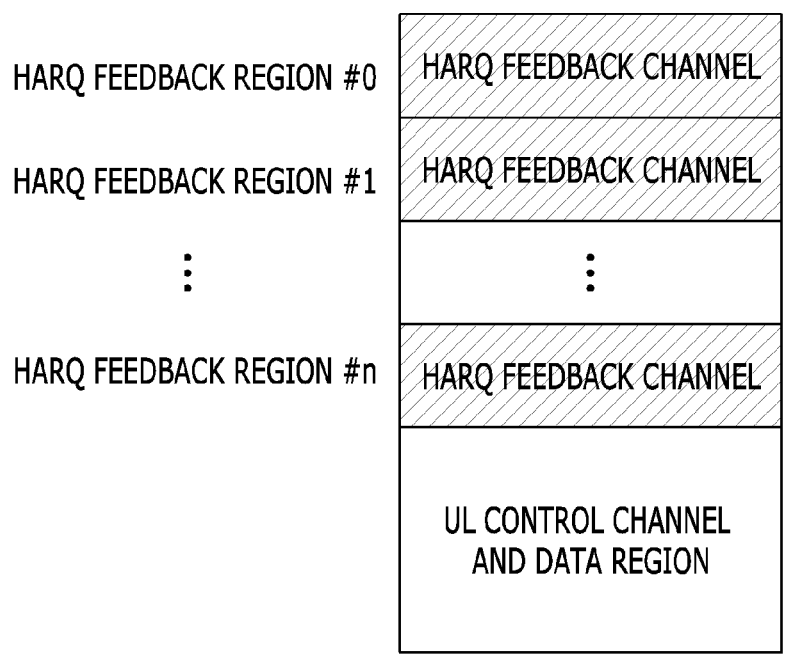
FIG. 7 is a view illustrating HARQ feedback regions of a sub-frame according to an exemplary embodiment of the present invention.

FIG. 7 is a view illustrating HARQ feedback regions of a sub-frame according to an exemplary embodiment of the present invention.

Referring to FIG. 7, a DL sub-frame i or an UL sub-frame l includes a plurality of HARQ feedback regions #0 to #n. The HARQ feedback regions #0 to #n may include the same number of HARQ feedback channels, respectively.

As described above, in accordance with a ratio between the DL and UL sub-frames that form one frame, the number of HARQ feedback regions may vary every sub-frame. In the TDD mode, when the number of sub-frames of DL and UL are equal to each other, the numbers of HARQ feedback regions of the DL and UL sub-frames may be 1, respectively. On the other hand, when ratios between DL and UL in the TDD mode are different from each other, the number of HARQ feedback regions of the DL and UL sub-frames varies in accordance with a relationship of transmission point in time mapping of the HARQ feedbacks such as resource allocation point in time and HARQ packet type data burst transmission point in time.

The DL and UL HARQ feedbacks in accordance with TDD DL HARQ transmitting and receiving timing or TDD UL HARQ transmitting and receiving timing are divided and allocated to the corresponding HARQ feedback regions in accordance with the configuration ratios of the DL and UL sub-frames, and the numbers of HARQ feedback regions may be illustrated in Tables 4 to 7 in accordance with the configuration ratios of DL and UL that are obtained from Tables 2 and 3.

Table 4 represents the numbers $R_i$ of HARQ feedback regions in ith DL and UL sub-frame index positions in the TDD frame where DL:UL=5:3.

TABLE 4

| | 5:3 | | | | | | | K |
|---|---|---|---|---|---|---|---|---|
| | DL | | | | UL | | | 1 |
| Sub-frame index | 0 | 1 | 2 | 3 | 4 | 0 | 1 | 2 |
| $R_i$ | 1 | 1 | 1 | 1 | 1 | 2 | 1 | 2 |

Table 5 represents the numbers $R_i$ of HARQ feedback regions in the ith DL and UL sub-frame index positions in the TDD frame where DL:UL=3:5.

TABLE 5

| | 3:5 | | | | | | | K |
|---|---|---|---|---|---|---|---|---|
| | DL | | | UL | | | | -1 |
| Sub-frame index | 0 | 1 | 2 | 0 | 1 | 2 | 3 | 4 |
| $R_i$ | 2 | 1 | 2 | 0 | 1 | 1 | 1 | 0 |

Table 6 represents the numbers $R_i$ of HARQ feedback regions in ith DL and UL sub-frame index positions in the TDD frame where DL:UL=4:3.

TABLE 6

| | 4:3 | | | | | | K |
|---|---|---|---|---|---|---|---|
| | DL | | | | UL | | 0 |
| Sub-frame index | 0 | 1 | 2 | 3 | 0 | 1 | 2 |
| $R_i$ | 1 | 1 | 1 | 1 | 1 | 1 | 2 |

Table 7 represents the numbers $R_i$ of HARQ feedback regions in the ith DL and UL sub-frame index positions in the TDD frame where DL:UL=3:4.

TABLE 7

| | 3:4 | | | | | | K |
|---|---|---|---|---|---|---|---|
| | DL | | | UL | | | -1 |
| Sub-frame index | 0 | 1 | 2 | 0 | 1 | 2 | 3 |
| $R_i$ | 2 | 1 | 1 | 1 | 1 | 1 | 1 |

In general, the base station 100 and the mobile station 200 store configuration information of the HARQ feedback regions in accordance with all the DL and UL configuration ratios illustrated in Table 1, that is, the numbers of HARQ feedback regions, in the memory in the form of the lookup table, and allocate the HARQ feedbacks to the HARQ feedback regions of the corresponding sub-frame index positions with reference to the lookup table. However, the method of using the lookup table configured in the system requires the memory for storing the lookup table, so it is difficult to apply it to a new frame structure in accordance with addition or change, and has a problem in that the configuration information of the HARQ feedback regions in accordance with the new frame structure must be updated in the lookup table.

The base station 100 and mobile station 200 according to the exemplary embodiment of the present invention may be simply applied to a new frame structure without changing the system and provide the configuration information of the HARQ feedback regions not by a memory storage method in the form of the lookup table but by simple equations.

Figure 8:
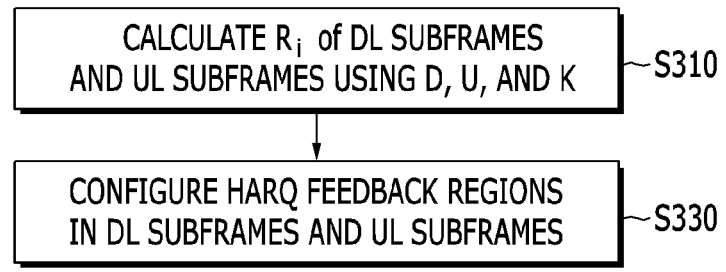
FIG. 8 is a view illustrating a method of providing HARQ feedback information according to an exemplary embodiment of the present invention.

FIG. 8 is a view illustrating a method of providing HARQ feedback information according to an exemplary embodiment of the present invention.

Referring to FIG. 8, HARQ feedback information providing apparatuses (not shown) of the base station 100 and the mobile station 200 provide the numbers of HARQ feedback regions using simple equations.

In order to provide the numbers of HARQ feedback regions by equations, the HARQ feedback information providing apparatuses calculate the numbers $R_i$ of HARQ feedback regions required for the DL and UL sub-frames using the parameter D that is the number of DL sub-frames provided by Tables 2 and 3, the parameter U that is the number of UL sub-frames, the respective sub-frame indices, and the parameter K obtained by Equation 1 (S310). That is, the K is obtained by the D and the U and the numbers of HARQ feedback regions may be obtained only by the D, the U, and the sub-frame indices.

The HARQ feedback information providing apparatuses configure the HARQ feedback regions in the DL and UL sub-frames using the numbers $R_i$ of HARQ feedback regions of the DL and UL sub-frames (S330). For example, as illustrated in FIG. 5, the two HARQ feedback regions for the HARQ feedbacks A1' and B1' are configured in the UL sub-frame index 0, the one HARQ feedback region for the HARQ feedback C1' is configured in the UL sub-frame index 1, and the two HARQ feedback regions for the HARQ feedbacks D1' and E1' are configured in the UL sub-frame index 2. Then, the corresponding HARQ feedbacks are allocated to the HARQ feedback regions.

Now, the method of the HARQ feedback information providing apparatuses calculating the numbers $R_i$ of HARQ feedback regions required for the DL and UL sub-frames will be described in detail.

The HARQ feedback information providing apparatuses divide the numbers $R_i$ of HARQ feedback regions in accordance with a magnitude of the number D of DL sub-frames and a magnitude of the number U of UL sub-frames and whether an absolute value |D−U| of subtraction between the number D of DL sub-frames and the number U of UL sub-frames or the sum D+U of the number D of DL sub-frames and the number U of UL sub-frames is an odd number or an even number.

When |D−U| or D+U is an even number including 0, the numbers $R_i$ of HARQ feedback regions are defined by Table 8.

TABLE 8

| |D − U| = an even number or (D + U) = an even number | | The number of HARQ feedback regions |
|---|---|---|
| For D > U | DL sub-frame | $R_i = 1$, for all the DL sub-frames, Wherein i is a DL sub-frame index |
| | UL sub-frame | $R_i = \begin{cases} \text{ceil}(D/U), & \text{if } (0 \leq i < K) \text{ or } (U - K \leq i < U) \\ 1, & \text{else } (K \leq i < U - K) \end{cases}$ Wherein i is a UL sub-frame index |
| For D ≤ U | DL sub-frame | $R_i = \begin{cases} \text{ceil}(U/D), & \text{if } (0 \leq i < -K) \text{ or } (D + K \leq i < D) \\ 1, & \text{else } (-K \leq i < D + K) \end{cases}$ Wherein i is a DL sub-frame index |

TABLE 8-continued

| $\|D - U\| =$ an even number or $(D + U) =$ an even number | The number of HARQ feedback regions |
|---|---|
| UL sub-frame | $R_i = \begin{cases} 1, & \text{if } (-K \leq i < D - K) \\ 0, & \text{else} \end{cases}$ |
| | Wherein i is a UL sub-frame index |

Referring to Table 8, in a frame where $\|D-U\|$ or $D+U$ is an even number and $D>U$, the number $R_i$ of HARQ feedback regions corresponding to the DL sub-frame index i is 1 with respect to all the DL sub-frames, and the number $R_i$ of HARQ feedback regions corresponding to the UL sub-frame index i may be obtained as illustrated in Equation 5.

$$R_i = \begin{cases} \text{ceil}(D/U), & \text{if } (0 \leq i < K) \text{ or } (U - K \leq i < U) \\ 1, & \text{else } (K \leq i < U - K) \end{cases} \quad \text{(Equation 5)}$$

In a frame where $\|D-U\|$ or $D+U$ is an even number and $D \leq U$, the number $R_i$ of HARQ feedback regions corresponding to the DL sub-frame index i may be obtained as illustrated in Equation 6.

$$R_i = \begin{cases} \text{ceil}(U/D), & \text{if } (0 \leq i < -K) \text{ or } (D + K \leq i < D) \\ 1, & \text{else } (-K \leq i < D + K) \end{cases} \quad \text{(Equation 6)}$$

In addition, the number $R_i$ of HARQ feedback regions corresponding to the UL sub-frame index i may be obtained by Equation 7.

$$R_i = \begin{cases} 1, & \text{if } (-K \leq i < D - K) \\ 0, & \text{else} \end{cases} \quad \text{(Equation 7)}$$

When $\|D-U\|$ or $D+U$ is an odd number, the numbers $R_i$ of HARQ feedback regions are defined by Table 9.

TABLE 9

| $\|D - U\| =$ an odd number or $(D + U) =$ an odd number | | The number of HARQ feedback regions |
|---|---|---|
| For $D > U$ | DL sub-frame | $R_i = 1$, for all the DL sub-frames, Wherein i is a DL sub-frame index |
| | UL sub-frame | $R_i = \begin{cases} \text{ceil}(D/U), & \text{if } (i = U - 1) \\ \text{floor}(D/U), & \text{else} \end{cases}$ |
| | | Wherein i is a UL sub-frame index |
| For $D \leq U$ | DL sub-frame | $R_i = \begin{cases} \text{ceil}(U/D), & \text{if } (i = 0) \\ \text{floor}(U/D), & \text{else} \end{cases}$ |
| | | Wherein i is a DL sub-frame index |
| | UL sub-frame | $R_i = \begin{cases} 1, & \text{if } (-K \leq i < D - K) \\ 0, & \text{else} \end{cases}$ |
| | | Wherein i is a UL sub-frame index |

Referring to Table 9, in a frame where $\|D-U\|$ or $D+U$ is an odd number and $D>U$, the number $R_i$ of HARQ feedback regions corresponding to the DL sub-frame index i is 1 with respect to all the DL sub-frames, and the number $R_i$ of HARQ feedback regions corresponding to the UL sub-frame index i may be obtained as illustrated in Equation 8.

$$R_i = \begin{cases} \text{ceil}(D/U), & \text{if } (i = U - 1) \\ \text{floor}(D/U), & \text{else} \end{cases} \quad \text{(Equation 8)}$$

In a frame where $\|D-U\|$ or $D+U$ is an odd number and $D \leq U$, the number $R_i$ of HARQ feedback regions corresponding to the DL sub-frame index i may be obtained as illustrated in Equation 9.

$$R_i = \begin{cases} \text{ceil}(U/D), & \text{if } (i = 0) \\ \text{floor}(U/D), & \text{else} \end{cases} \quad \text{(Equation 9)}$$

In addition, the number $R_i$ of HARQ feedback regions corresponding to the UL sub-frame index i may be obtained as illustrated in Equation 10.

$$R_i = \begin{cases} 1, & \text{if } (-K \leq i < D - K) \\ 0, & \text{else} \end{cases} \quad \text{(Equation 10)}$$

In addition, the HARQ feedback information providing apparatuses may calculate a minimum value and a maximum value of the numbers $R_i$ of HARQ feedback regions for the DL and UL sub-frames when $\|D-U\|$ or $D+U$ is an even number and an odd number.

Table 10 represents a minimum value ($R_{minDL}$, $R_{minUL}$) and a maximum value ($R_{maxDL}$, $R_{maxUL}$) of the numbers $R_i$ of HARQ feedback regions for the DL and UL sub-frames when $\|D-U\|$ or $D+U$ is an even number.

TABLE 10

| $\|D - U\|$ or $(D + U) =$ an even number | | The maximum value and the minimum value of the number of HARQ feedback regions |
|---|---|---|
| For $D > U$ | DL sub-frame | $R_{maxDL} = R_{minDL} = 1$ |
| | UL sub-frame | $R_{maxUL} = \text{ceil}(D/U)$ |
| | | $R_{minUL} = \begin{cases} R_{maxUL}, & \text{if } \text{Mod}(D, U) = 0 \\ 1, & \text{else} \end{cases}$ |
| For $D \leq U$ | DL sub-frame | $R_{maxDL} = \text{ceil}(U/D)$ |
| | | $R_{minDL} = \begin{cases} R_{maxDL}, & \text{if } \text{Mod}(U, D) = 0 \\ 1, & \text{else} \end{cases}$ |
| | UL sub-frame | $R_{maxUL} = 1$ |
| | | $R_{minUL} = 0$ |

Referring to Table 10, a method of obtaining the minimum value ($R_{minDL}$, $R_{minUL}$) and the maximum value ($R_{maxDL}$, $R_{maxUL}$) of the numbers $R_i$ of HARQ feedback regions of DL and UL in the TDD mode when $\|D-U\|$ or $D+U$ is an even number will be described as follows.

When $D>U$, the minimum value ($R_{minDL}$) and the maximum value ($R_{maxDL}$) of the numbers $R_i$ of HARQ feedback regions in the DL sub-frames are equal to each other, and are 1. That is, $R_{maxDL}=R_{minDL}=1$. In the UL sub-frames, the maximum value ($R_{maxUL}$) of the numbers $R_i$ of HARQ feedback regions is ceil(D/U) and the minimum value ($R_{minUL}$) of the numbers $R_i$ of HARQ feedback regions may be obtained as illustrated in Equation 11.

$$R_{minUL} = \begin{cases} R_{maxUL}, & \text{if } \text{Mod}(D, U) = 0 \\ 1, & \text{else} \end{cases} \quad \text{(Equation 11)}$$

Here, Mod(D,U) represents an operation of obtaining a remainder by dividing a dividend D by a divisor U.

When D≤U, in the DL sub-frames, the maximum value ($R_{maxDL}$) of the numbers $R_i$ of HARQ feedback regions is ceil(U/D) and the minimum value ($R_{minDL}$) of the numbers $R_i$ of HARQ feedback regions may be obtained as illustrated in Equation 12.

$$R_{minDL} = \begin{cases} R_{maxDL}, & \text{if } \text{Mod}(U, D) = 0 \\ 1, & \text{else} \end{cases} \quad \text{(Equation 12)}$$

Here, Mod(D,U) represents an operation of obtaining a remainder by dividing a dividend U by a divisor D.

In the UL sub-frames, the maximum value ($R_{maxUL}$) of the numbers $R_i$ of HARQ feedback regions is 1 and the minimum value ($R_{minUL}$) of the numbers $R_i$ of HARQ feedback regions is 0.

Table 11 represents a minimum value ($R_{minDL}$, $R_{minUL}$) and a maximum value ($R_{maxDL}$, $R_{maxUL}$) of the numbers $R_i$ of HARQ feedback regions for the DL and UL sub-frames when |D−U| or D+U is an even number.

TABLE 11

| |D − U| or (D + U) = an odd number | | The maximum value and the minimum value of the number of HARQ feedback regions |
|---|---|---|
| For D > U | DL sub-frame | $R_{maxDL} = R_{minDL} = 1$ |
| | UL sub-frame | $R_{maxUL}$ = ceil(D/U)<br>$R_{minUL}$ = floor(D/U) |
| For D ≤ U | DL subframe | $R_{maxUL}$ = ceil(U/D)<br>$R_{minUL}$ = floor(U/D) |
| | UL subframe | $R_{maxUL}$ = 1<br>$R_{minUL}$ = 0 |

Referring to Table 11, in the TDD mode, a method of obtaining the minimum value ($R_{minDL}$, $R_{minUL}$) and the maximum value ($R_{maxDL}$, $R_{maxUL}$) of the numbers HARQ feedback regions of DL and UL when |D−U| or D+U is an even number will be described as follows.

When D>U, the minimum value ($R_{minDL}$) ($R_{maxDL}$) and the maximum value ($R_{maxDL}$) of the numbers $R_i$ of HARQ feedback regions in the DL sub-frames are equal to each other, and are 1. That is, $R_{maxDL} = R_{minDL} = 1$. In the UL sub-frames, the maximum value ($R_{maxUL}$) of the numbers $R_i$ of HARQ feedback regions is ceil (D/U) and the minimum value ($R_{minUL}$) of the numbers $R_i$ of HARQ feedback regions is floor(D/U).

When D≤U, in the DL sub-frames, the maximum value ($R_{maxDL}$) of the numbers $R_i$ of HARQ feedback regions is ceil(U/D) and the minimum value ($R_{minDL}$) of the numbers $R_i$ of HARQ feedback regions is floor(U/D). In the UL sub-frames, the maximum value ($R_{maxUL}$) of the numbers $R_i$ of HARQ feedback regions is 1 and the minimum value ($R_{minUL}$) of the numbers $R_i$ of HARQ feedback regions is 0.

On the other hand, in the FDD mode, in the DL sub-frames and the UL sub-frames, the numbers $R_i$ of HARQ feedback regions and the maximum value ($R_{max}$) and the minimum value ($R_{min}$) of the numbers $R_i$ of HARQ feedback regions are equal to each other, and are 1. That is, in the DL sub-frames and the UL sub-frames, $R_i = R_{max} = R_{min} = 1$.

As described above, the HARQ feedback information providing apparatuses obtain the numbers of HARQ feedback regions for all the sub-frame index positions of DL and UL in accordance with the ratios of DL and UL of various types of TDD frames and the maximum value and the minimum value of the numbers of HARQ feedback regions by the simple equations to obtain the configuration information of the HARQ feedback regions in accordance with all the frame configuration ratios without using the lookup table as the memory storage method, to reduce sizes of memories in the base station and the terminal, and to be simply applied to a newly added or changed frame structure without changing the system so that it is possible to improve reliability of the system.

According to the exemplary embodiment of the present invention, configuration information of the HARQ feedback regions to which and from which HARQ feedbacks ACK and NACK are transmitted and received in all the sub-frame index positions of downlink and uplink in accordance with the configuration ratios of the TDD frame may be easily obtained by equations.

In addition, since the lookup table that is the memory storage method is not used, in the base station and the terminal, sizes of memories may be reduced and the base station and the terminal may be applied to a newly added frame structure without changing the system by updating the lookup table. Therefore, it is possible to improve reliability of the system.

The exemplary embodiment of the present invention is not realized only by the above-described apparatus and/or method but may be realized by a program for realizing a function corresponding to configuration of the exemplary embodiment of the present invention and a recording medium in which the program is recorded. Such realization may be easily performed by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of providing hybrid automatic repeat request (HARQ) feedback information in a wireless communication system where a terminal and a base station communicate with each other using a frame including at least one downlink sub-frame and at least one uplink sub-frame, the method comprising:
   calculating a third value corresponding to an absolute value of subtraction between a first value corresponding to a number of downlink sub-frames of the frame and a second value corresponding to a number of uplink sub-frames of the frame or the sum of the first value and the second value;
   calculating a number of HARQ feedback regions of the downlink sub-frames and the uplink sub-frames in accordance with the third value; and
   configuring HARQ feedback regions in the downlink sub-frames and the uplink sub-frames in accordance with the number of HARQ feedback regions of the downlink sub-frames and the uplink sub-frames.

2. The method of claim 1, wherein calculating the number of HARQ feedback regions of the downlink sub-frames and the uplink sub-frames in accordance with the third value comprises determining the number of HARQ feedback regions of the downlink sub-frames and the uplink sub-frames in accordance with a magnitude of the first value and a magnitude of the second value and whether the third value is an even number or an odd number.

3. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the downlink sub-frames as 1 when the third value is an even number and the first value is larger than the second value.

4. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the uplink sub-frames as the smallest integer of integers larger than or equal to a value obtained by dividing the first value by the second value or 1 in accordance with parameters determined in accordance with the first value and the second value when the third value is an even number and the first value is larger than the second value.

5. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the downlink sub-frames as the smallest integer of integers larger than or equal to a value obtained by dividing the second value by the first value or 1 in accordance with parameters determined in accordance with the first value and the second value when the third value is an even number and the first value is smaller than or equal to the second value.

6. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the uplink sub-frames as 1 or 0 in accordance with parameters determined in accordance with the first value and the second value when the third value is an even number and the first value is smaller than or equal to the second value.

7. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the downlink sub-frames as 1 when the third value is an odd number and the first value is larger than the second value.

8. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the uplink sub-frames as the smallest integer of integers larger than or smaller than a value obtained by dividing the first value by the second value or the largest integer of integers smaller than or equal to a value obtained by dividing the first value by the second value in accordance with the second value when the third value is an odd number and the first value is larger than the second value.

9. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the downlink sub-frames as the smallest integer of integers larger than or smaller than a value obtained by dividing the second value by the first value or the largest integer of integers smaller than or equal to a value obtained by dividing the second value by the first value in accordance with the indices of the downlink sub-frames when the third value is an odd number and the first value is smaller than or equal to the second value.

10. The method of claim 2, wherein determining the number of HARQ feedback regions of the downlink sub-frames and the uplink sub-frames in accordance with a magnitude of the first value and a magnitude of the second value and whether the third value is an even number or an odd number comprises determining the number of HARQ feedback regions of the uplink sub-frames as 1 or 0 in accordance with parameters determined in accordance with the first value and the second value when the third value is an odd number and the first value is smaller than or equal to the second value.

11. The method of claim 1, further comprising calculating a maximum value and a minimum value of the number of HARQ feedback regions of the downlink sub-frames and the uplink sub-frames in accordance with the third value.

12. The method of claim 11, wherein calculating a maximum value and a minimum value of the number of HARQ feedback regions of the downlink sub-frames and the uplink sub-frames in accordance with the third value comprises determining the maximum value and the minimum value of the number of HARQ feedback regions of the downlink sub-frames and the uplink sub-frames in accordance with a magnitude of the first value and a magnitude of the second value and whether the third value is an even number or an odd number.

13. The method of claim 12, wherein, when the third value is an even number and the first value is larger than the second value, calculating a maximum value and a minimum value of the number of HARQ feedback regions of the downlink sub-frames and the uplink sub-frames in accordance with the third value comprises:
determining the maximum value and the minimum value of the number of HARQ feedback regions of the downlink sub-frames as 1, respectively;
determining the maximum value of the number of HARQ feedback regions of the uplink sub-frames as the smallest integer of integers larger than or equal to a value obtained by dividing the first value by the second value; and
determining the minimum value of the number of HARQ feedback regions of the uplink sub-frames using the following equation,
wherein the equation is $$\text{Minimum value} = \begin{cases} R_{maxDL}, & \text{if } \text{Mod}(U, D) = 0 \\ 1, & \text{else} \end{cases}$$

wherein $R_{maxUL}$ is the maximum value of the number of HARQ feedback regions of the uplink sub-frames, D is the first value, U is the second value, and Mod(D,U) returns a remainder obtained by dividing a dividend D by a divisor U.

14. The method of claim 12, wherein, when the third value is an even number and the first value is smaller than or equal to the second value, calculating a maximum value and a minimum value of the number of HARQ feedback regions of the downlink sub-frames and the uplink sub-frames in accordance with the third value comprises:
  determining the maximum value of the number of HARQ feedback regions of the downlink sub-frames as the smallest integer of integers larger than or equal to a value obtained by dividing the second value by the first value;
  determining the minimum value of the number of HARQ feedback regions of the downlink sub-frames using the following equation; and
  determining the maximum value and the minimum value of the number of HARQ feedback regions of the uplink sub-frames as 1 and 0, respectively,
  wherein the equation is $$\text{Minimum value} = \begin{cases} R_{maxUL}, & \text{if } \text{Mod}(D, U) = 0 \\ 1, & \text{else} \end{cases}$$

wherein $R_{maxDL}$ is the maximum value of the number of HARQ feedback regions of the downlink sub-frames, D is the first value, U is the second value, and Mod(U,D) returns a remainder obtained by dividing a dividend U by a divisor D.

15. The method of claim 12, wherein, when the third value is an odd number and the first value is larger than the second value, calculating a maximum value and a minimum value of the number of HARQ feedback regions of the downlink sub-frames and the uplink sub-frames in accordance with the third value comprises:
  determining the maximum value and the minimum value of the number of HARQ feedback regions of the downlink sub-frames as 1, respectively;
  determining the maximum value of the number of HARQ feedback regions of the uplink sub-frames as the smallest integer of integers larger than or equal to a value obtained by dividing the first value by the second value; and
  determining the minimum value of the number of HARQ feedback regions of the uplink sub-frames as the largest integer of integers smaller than or equal to a value obtained by dividing the first value by the second value.

16. The method of claim 12, wherein, when the third value is an odd number and the first value is smaller than or equal to the second value, calculating a maximum value and a minimum value of the number of HARQ feedback regions of the downlink sub-frames and the uplink sub-frames in accordance with the third value comprises:
  determining the maximum value of the number of HARQ feedback regions of the downlink sub-frames as the smallest integer of integers larger than or equal to a value obtained by dividing the second value by the first value;
  determining the minimum value of the number of HARQ feedback regions of the downlink sub-frames as the largest integer of integers smaller than or equal to a value obtained by dividing the second value by the first value; and
  determining the maximum value and the minimum value of the number of HARQ feedback regions of the uplink sub-frames as 1 and 0, respectively.

17. A method of providing hybrid automatic repeat request (HARQ) feedback information in a wireless communication system where a terminal and a base station communicate with each other using a frame including at least one downlink sub-frame and at least one uplink sub-frame, the method comprising:
  calculating a third value corresponding to an absolute value of subtraction between a first value corresponding to the number of downlink sub-frames of the frame and a second value corresponding to the number of uplink sub-frames of the frame or the sum of the first value and the second value;
  determining the number of HARQ feedback regions of the downlink sub-frames and the uplink sub-frames in accordance with a magnitude of the first value and a magnitude of the second value and whether the third value is an even number or an odd number; and
  configuring HARQ feedback regions in the downlink sub-frames and the uplink sub-frames in accordance with the number of HARQ feedback regions of the downlink sub-frames and the uplink sub-frames,
  wherein HARQ feedback signals corresponding to the HARQ feedback regions are allocated to the downlink sub-frames and the uplink sub-frames.

18. The method of claim 17, further comprising determining the minimum value and the maximum value of the number of HARQ feedback regions of the downlink sub-frames and the uplink sub-frames in accordance with a magnitude of the first value and a magnitude of the second value and whether the third value is an even number or an odd number.

19. The method of claim 17, wherein determining the number of HARQ feedback regions of the downlink sub-frames and the uplink sub-frames in accordance with a magnitude of the first value and a magnitude of the second value and whether the third value is an even number or an odd number comprises:
  determining the number of HARQ feedback regions of the downlink sub-frames as 1 and determining the number of HARQ feedback regions of the uplink sub-frames as the smallest integer of integers larger than or equal to a value obtained by dividing the first value by the second value or 1 in accordance with parameters determined in accordance with the first value and the second value when the third value is an even number and the first value is larger than the second value; and
  determining the number of HARQ feedback regions of the downlink sub-frames as the smallest integer of integers larger than or equal to a value obtained by dividing the second value by the first value or 1 in accordance with parameters determined in accordance with the first value and the second value and determining the number of HARQ feedback regions of the uplink sub-frames as 1 or 0 in accordance with the parameters when the third value is an even number and the first value is smaller than or equal to the second value.

20. The method of claim 17, wherein determining the number of HARQ feedback regions of the downlink sub-frames and the uplink sub-frames in accordance with a magnitude of the first value and a magnitude of the second value and whether the third value is an even number or an odd number comprises:
  determining the number of HARQ feedback regions of the downlink sub-frames as 1 and determining the number of HARQ feedback regions of the uplink sub-frames as the smallest integer of integers larger than or smaller than a value obtained by dividing the first value by the second value or the largest integer of integers smaller than or equal to a value obtained by dividing the first value by the second value according to the second value when the third value is an odd number and the first value is larger than the second value; and determining the number of HARQ feedback regions of the downlink sub-frames as the smallest integer of integers larger than or smaller than a value obtained by dividing the second value by the first value or the largest integer of integers smaller than or equal to a value obtained by dividing the second value by the first value and determining the number of HARQ feedback regions of the uplink sub-frames as 1 or 0 according to parameters determined in accordance with the first value and the second value when the third value is an odd number and the first value is smaller than or equal to the second value.

* * * * *